US005970600A

United States Patent [19]

Huang et al.

[11] Patent Number: 5,970,600

[45] Date of Patent: Oct. 26, 1999

[54] METHOD OF MAKING BRUSHLESS DC PERMANENT MAGNET STATOR WINDINGS

[75] Inventors: Hao Huang, Montevideo; Darwin Caskey, Appleton; Ed Lipinski, Watson, all of Minn.

[73] Assignee: SL Montevideo Technology, Inc., Montevideo, Minn.

[21] Appl. No.: 09/146,426

[22] Filed: Sep. 3, 1998

Related U.S. Application Data

[62] Division of application No. 08/890,673, Jul. 9, 1997.

[51] Int. Cl.$^6$ .................................................. H02K 15/08

[52] U.S. Cl. ............................ 29/596; 310/184; 310/208

[58] Field of Search ........................ 29/596, 598; 310/42, 310/184, 185, 208; 242/432, 432.1–432.6

[56] References Cited

U.S. PATENT DOCUMENTS

| | | |
|---|---|---|
| 2,491,943 | 12/1949 | Abbott . |
| 2,735,950 | 2/1956 | Brown . |
| 2,856,548 | 10/1958 | Krebs . |
| 3,502,916 | 3/1970 | Stavrache et al. . |
| 4,218,630 | 8/1980 | Watanabe . |
| 4,219,748 | 8/1980 | Sakaguchi et al. . |
| 4,465,948 | 8/1984 | Oyama et al. . |
| 4,541,575 | 9/1985 | Dickerson . |
| 4,614,161 | 9/1986 | Frederick . |
| 4,687,961 | 8/1987 | Horber . |
| 4,797,602 | 1/1989 | West . |
| 4,980,594 | 12/1990 | Poro . |
| 5,319,844 | 6/1994 | Huang et al. . |
| 5,382,859 | 1/1995 | Huang et al. . |
| 5,394,045 | 2/1995 | Takehara . |
| 5,508,571 | 4/1996 | Shafer, Jr. . |
| 5,559,380 | 9/1996 | Nakamura et al. . |
| 5,592,731 | 1/1997 | Huang et al. . |

FOREIGN PATENT DOCUMENTS

| | | |
|---|---|---|
| 57055748 | 4/1982 | European Pat. Off. . |
| 59059034 | 9/1982 | European Pat. Off. . |
| 433 247 | 6/1991 | European Pat. Off. . |
| 37 35734 | 5/1989 | Germany . |

*Primary Examiner*—Carl E. Hall
*Attorney, Agent, or Firm*—Nixon & Vanderhye P.C.

[57] ABSTRACT

A brushless permanent magnet DC motor for use in a traction drive system has power density and high efficiency. The motor includes a multiple turn, fast insertion, double wave winding which does not have distinct interconnection wires between the coils (the interconnections are part of the coils), and the end turns are distributed on both sides of the stator core so as to minimize the size of the end turns. The housing is part of the stator and has integral, radially extending, circumferentially spaced cooling fins so that there is no thermal gap, or thermal contact, resistance between separate housing and stator components. The motor includes bearings mounting a shaft of the rotor of the motor, and structures for positively maintaining the bearings concentric with the stator to provide optimized service life. A stator assembly, per se, having novel windings may be utilized in other motors, and a novel method of winding a stator that is simple yet achieves the desired results of efficiency and minimized cost, are also provided.

10 Claims, 10 Drawing Sheets

METHOD OF MAKING BRUSHLESS DC PERMANENT MAGNET STATOR WINDINGS

This is a divisonal of application Ser. No. 08/890,673, filed Jul. 9, 1997.

BACKGROUND AND SUMMARY OF THE INVENTION

Brushless permanent DC motors are becoming increasingly popular, including for traction drive systems, that is for vehicles, such as golf carts, electric scooters, electric motorcycles, electric cars, slab crabs, electric outboard motors for boats, etc. In such an environment, high power density and high efficiency are the primary performance needs.

In order to achieve high power density and high efficiency for such applications, it is critical that an effective winding configuration of the stator coils, and an efficient cooling mechanism, are provided. Since traction drive applications are high power applications, the number of turns per stator slot is low and the percentage of resistance of the interconnections between the coils compared with total winding resistance is high if conventional lap winding configurations are used. Thus, conventional lap winding configurations increase copper losses, and reduce motor efficiency.

Conventional wave windings do not have the same interconnection resistance problems that lap windings do, but have large end turn problems. Because the end turns in conventional wave windings are not symmetrically distributed on both sides of the stator core there is an increase in the volume and weight of the motor, and reduced power density. The wave winding used in U.S. Pat. Nos. 5,592,731, 5,832,859 and 5,319,844 does not have the same problems as the conventional wave windings do, but is much more difficult to wind because one has to insert windings into slots one turn at a time.

The vast majority of conventional electric machines, including brushless permanent magnet DC motors, are housed inside of a motor housing. Typically, there is a set of cooling fins attached to the outside diameter of the housing. This conventional construction has several drawbacks, however. One drawback is that there is a contact thermal resistance between the stator and the motor housing. Another is a higher cost than desirable; because the machining of the distinct housing and stator housing assemblies is difficult because there are multiple components.

According to the present invention a brushless magnetic DC motor, and a stator assembly (and method of production thereof) for such motors, are provided which have a number of advantages compared to the prior art described above. The novel winding configuration according to the invention has no distinct interconnection wires between coils, and has much smaller end turns than conventional wave windings, resulting in higher power density and higher efficiency. The motor according to the invention also has a motor housing, cooling fins, and shroud (if provided) which are part of the stator, resulting in a reduced cost of construction, and enhanced cooling since there is no thermal gap, or thermal contact, resistance between a distinct housing and stator.

According to one aspect of the present invention, a brushless permanent magnet DC motor is provided comprising the following components: A stator having first and second sides. A rotor containing permanent magnets and radially spaced with respect to the stator to cooperate with the stator. A housing containing the stator and rotor. A stator winding having a plurality of coils, and end turns. And the end turns of the winding distributed on both the first and second sides of the stator, and the coils of the winding being unconnected to each other by distinct interconnection wires (that is the interconnections between the coils are part of the coils).

Preferably the windings comprises copper wires having a size between 26–32 AWG (i.e. about 0.0161–0.0079 inches in diameter), and the windings are impregnated with varnish to isolate the copper wires. However, no varnish is provided on machined surfaces. The stator has slots, and preferably the motor is a multiple (e.g. three) phase motor having multiple (e.g. four) coils, and the windings comprises one or more (e.g. four) turns per slot for each coil. The windings typically include lead wires, and the motor further comprises lacing cord lacing the end turns and the lead wires.

Preferably the stator includes the housing and integral, radially extending, circumferentially spaced cooling fins, so that there is no thermal gap, or thermal contact, resistance between distinct housing and stator components. Typically the rotor comprises a central shaft and a fan may be connected to the shaft for forcing air between the cooling fins to effectively receive heat transferred from the cooling fins, and carry the transferred heat away from the motor.

The motor also includes end caps having bearings mounting the shaft for relatively friction-free rotation with respect to the stator. Also, in order to provide optimized service life, means are provided for positively maintaining the bearings concentric with the stator. While any conventional structure may be utilized for positively maintaining the bearings concentric with the stator, preferably such means comprise the outside of the stator locating the radial position of the end caps; or when positioning rings are connected to the end caps then the positively positioning means may comprise fasteners extending between some of the spaced cooling fins and the positioning rings to connect the end caps together so that the fasteners locate the radial position of the end caps.

The motor according to the invention is typically adapted to be mounted in a vehicle for powering the vehicle.

According to another aspect of the present invention a brushless permanent magnet DC motor is provided comprising the following components: A stator having first and second sides. A rotor containing permanent magnets and radially spaced with respect to the stator to cooperate with the stator. A housing containing the stator and rotor. A stator winding having a plurality of coils, and end turns. And wherein the housing is part of the stator, and the stator/housing has integral, radially extending, circumferentially spaced cooling fins, so that there is no thermal gap, or thermal contact, resistance between distinct housing and stator components. The details of the housing, rotor, and the like preferably are as described above.

The invention also relates to a stator assembly for a brushless permanent magnet DC motor. The stator assembly comprises the following components: A stator having first and second sides. A stator winding having a plurality of coils, and end turns. And the end turns of the winding distributed on both the first and second sides of the stator, and the coils of the winding being unconnected to each other by distinct interconnection wires, interconnections between the coils comprising part of the coils. The details of the windings are preferably as described above.

The invention also relates to a method of winding a stator for a brushless permanent magnet DC motor, the stator having first and second ends, a given thickness, and slots. The method comprises the steps of: (a) Preparing a wire bundle from multiple small size copper wires by laying out a wire having a length L for one branch of a phase, and forming a circle from the wire, the circle having a diameter of L/(N$\pi$), where N is the number of turns per half slot. (b) Placing the wire in the form of the circle in one of the slots of the stator with so that some of the wire of the circle is on each side of the stator with a given winding span. (c) Using the same pattern, placing all the wire of the bundle, formed into circles, into slots so that the end turns of the windings are on both said first and second sides of the stator. And (d) repeating steps (a)–(c) for the winding coils of one or more other phases so that there are no distinct interconnection wires between coils, interconnections between the coils comprising part of the coils.

In one preferred form of the invention the slots include slots 1 through 12 (a different number can be provided), and each phase coil includes first and second leads. In this situation steps (a) through (c) are practiced so that the first lead of the first phase coil is in slot 1, and the second lead of the first phase coil is in slot 10. For the second and third phase coils, the first lead of the second coil is in slot 2 and the second lead of the second coil in slot 11, and the first lead of the third coil is in slot 3, and the second lead of the third coil in slot 12. Typically steps (a) through (d) are practiced using varnished copper wire of the size between 26–32 AWG.

It is a primary object of the present invention to provide a novel winding configuration, and a motor and stator assembly constructed thereby, and a motor structure with enhanced cooling and lower cost than conventional motors for traction drive systems. This and other objects of the invention will become clear from an inspection of the detailed description of the invention, and from the appended claims.

DETAILED DESCRIPTION OF THE DRAWINGS

Figure 1A:
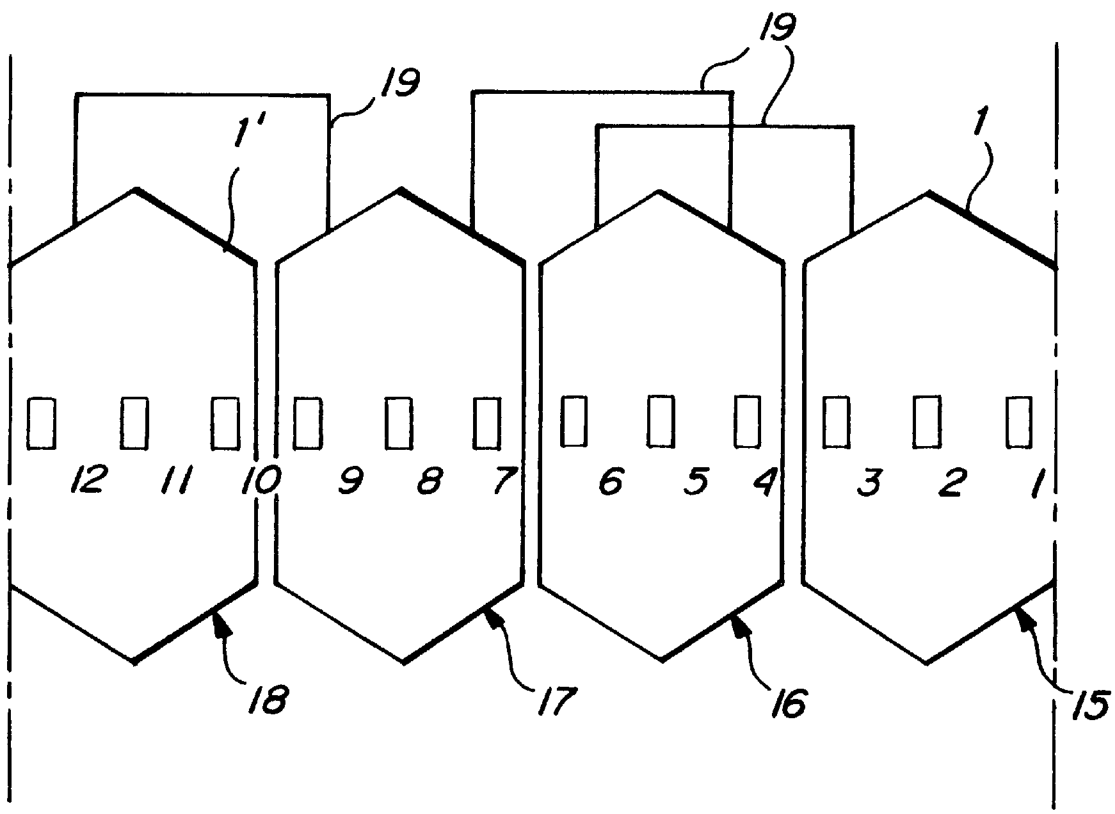
FIG. 1A is a schematic representation of a conventional lap winding with distinct interconnection wires.

FIG. 1A schematically (deployed from a circular configuration to a linear one for clarity of illustration) illustrates a conventional lap winding having slots numbered 1–12 and coils 15–18. The coils 15–18 have distinct interconnection wires 19, which are necessary to properly attach the coils 15–18 together.

Figure 1B:
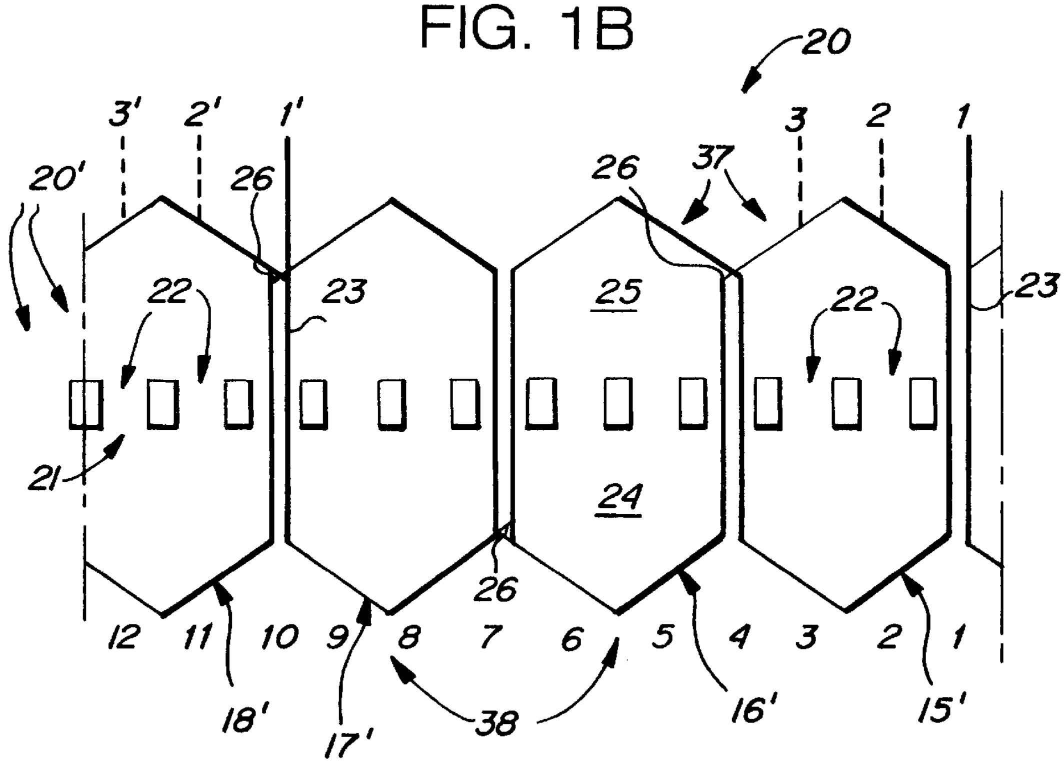
FIG. 1B is a schematic representation showing one phase of an exemplary winding according to the present invention, with the leads for other phases shown in dotted line.

FIG. 1B schematically illustrates an exemplary winding according to the present invention, shown generally by reference numeral 20, deployed from a circular configuration to a linear configuration for clarity of illustration. The stator associated with the winding 20 is shown schematically at 21 in FIG. 1B, and in FIGS. 6–8, with slots 22, the slots being shown as numbered 1 through 12 in FIG. 1B, but typically more slots than that are provided. A first phase is shown in solid line in FIG. 1B indicated by reference numeral 23, having a first lead 1 and a second lead 1'. The stator 21 has a first side 24 and a second side 25, and as seen in FIG. 1B the wire 23 is wound so that it is distributed on both sides 24, 25 of the stator core 21, and has the configuration illustrated in FIG. 1B.

What is illustrated in solid line as a wire 23 in FIG. 1B is for one phase of the winding 20 having coils 15'–18'. With the first lead 1 disposed in slot 1, the second lead 1' is disposed in slot 10, with the wires bending back and forth forming the winding 20 being disposed in slots 4, 7, 13, etc. What is illustrated in FIG. 1B is repeated for other phases of the winding 20. For example, the first lead for the second phase coil is indicated by reference numeral 2 in FIG. 1B, while the second lead for that phase is indicated by 2', while the first lead line for the third phase indicated by 3 and the second lead for the third phase indicated by 3', the leads for the second phase being in slots 2 and 11, and for the third phase being in slots 3 and 12. The same pattern repeats, one slot 22 over, for both the second and third phases (for a three phase motor which is the most common), and in the winding configuration according to the invention there are no distinct interconnection wires (like the wires 19 in FIG. 1A) between coils 15'–18', rather the interconnections are part of the coils, as schematically illustrated at 26 in FIG. 1B. Interconnections 26 extend through slots 22.

Figure 2:
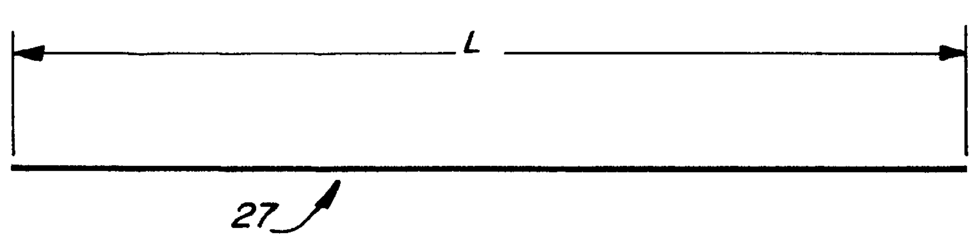
FIG. 2 is a schematic representation of a wire length of a bundle for one branch of a phase according to the present invention.
Figure 4:
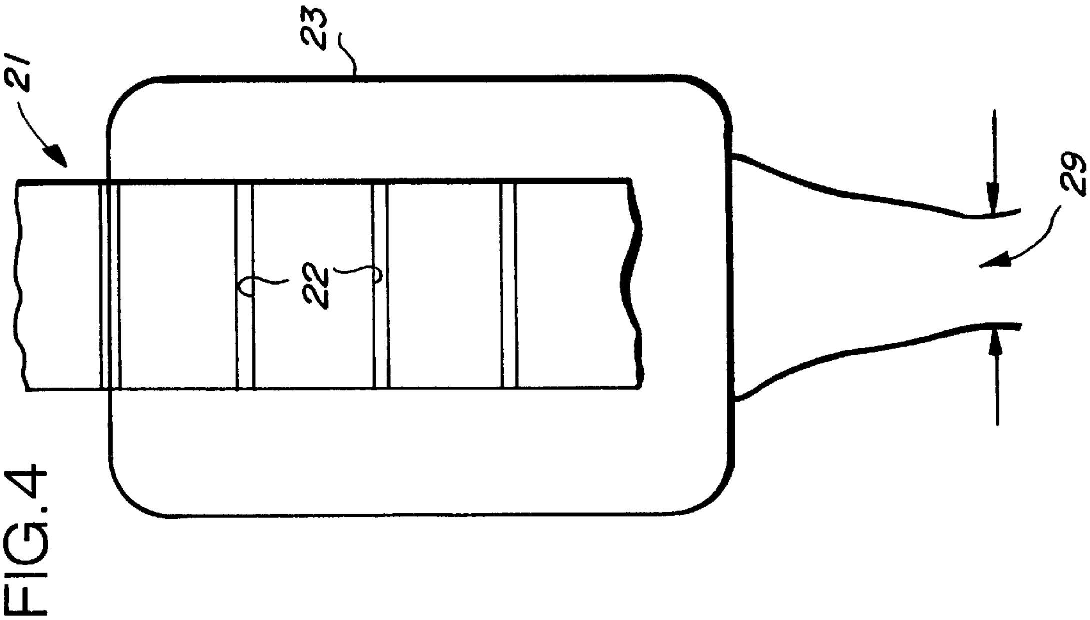
FIG. 4 is a schematic representation illustrating placement of the wire of the circle of FIG. 3 into association with one of the slots of the stator according to the invention.

FIG. 2 schematically illustrates the first step in effecting the winding of FIG. 1, before the winding 20 is inserted into the stator core 21. As schematically illustrated in FIG. 2, a one wire bundle 27 is provided having a length L for one branch of the phase coil. The wire forming the bundle 27 preferably comprises multiple small size varnish-insulated copper wires. Typical sizes for the wires are preferably 26–32 American Wire Gauge (AWG). 26 AWG typically has a minimum diameter of about 0.0157 inches and a maximum diameter of about 0.0161 inches, while 32 AWG typically has a maximum diameter of about 0.0081 inches and a minimum diameter of about 0.0079 inches. The nominal resistance in ohmage per 1000 at 20° C. is about 162 for 32 AWG, and about 41 for 26 AWG.

Figure 3:
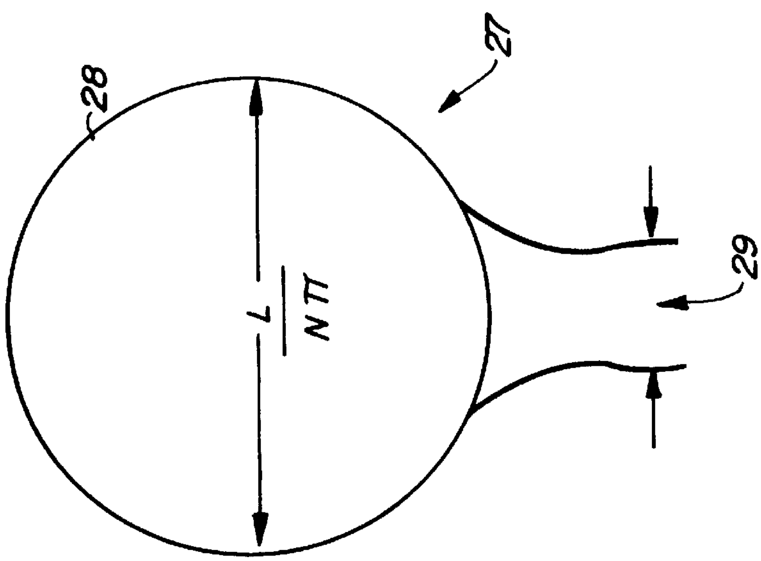
FIG. 3 is a schematic representation showing the formation of the bundle of FIG. 2 into a circle.

The next step, after that illustrated in FIG. 2, is to form a circle 28 from the bundle 27, as schematically illustrated in FIG. 3. The circle 28 has a diameter equal to L/Nπ, where N is the number of turns per half slot and L is the length of the bundle 27 for one branch of the phase as illustrated in FIG. 2. A winding span 29 is provided.

Figure 5:
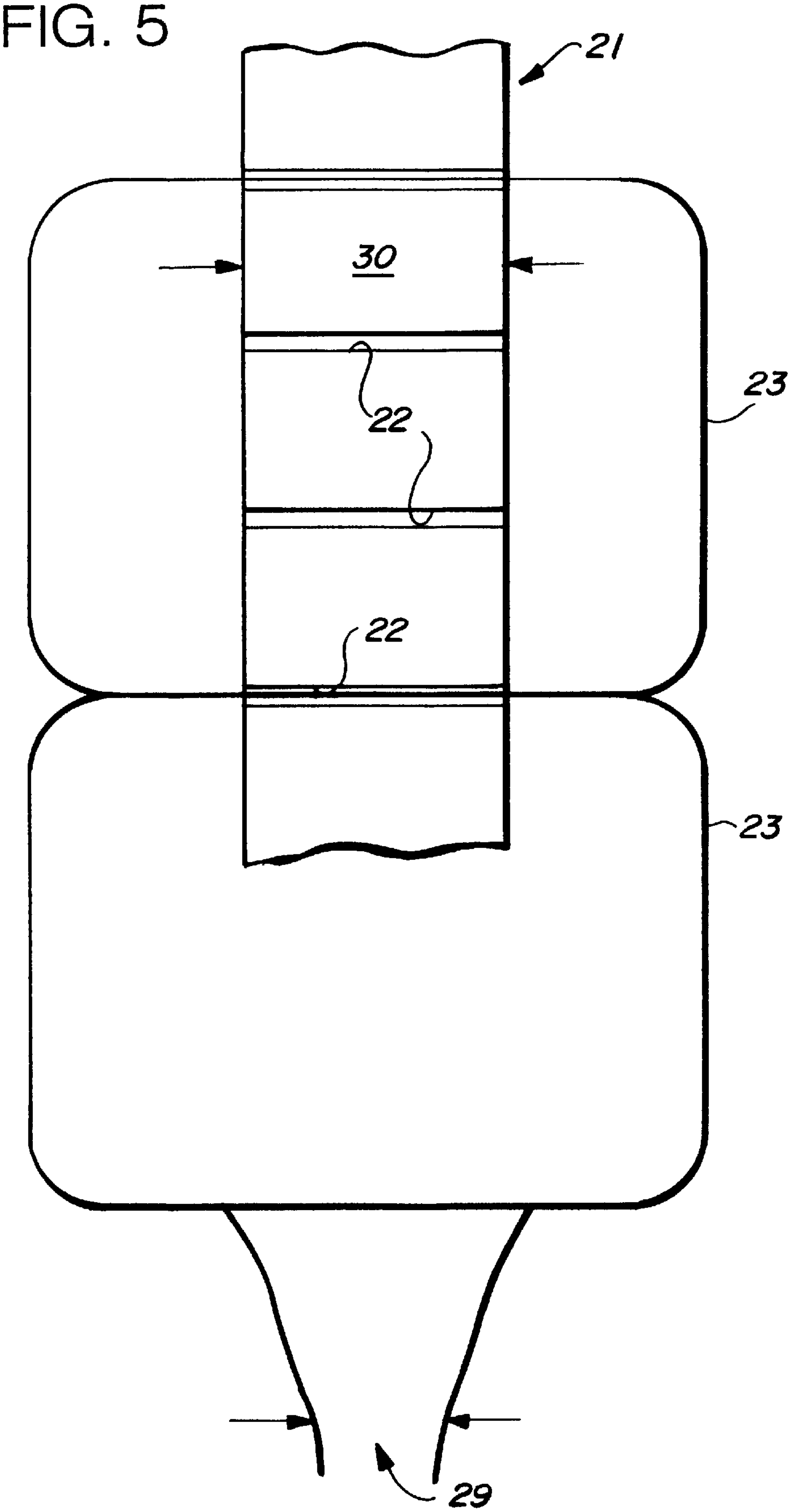
FIG. 5 schematically illustrates the next step in the formation of the winding according to the invention after FIG. 4.

The next step is to place the wires in the bundle 27, the wires now being illustrated at 23 in the schematic illustration of FIG. 1, in one of the slots 22 of the stator 21. As schematically illustrated in FIG. 5, this procedure is repeated for other slots 22, until the configuration illustrated schematically in FIG. 1 is provided for that particular phase. The winding span in FIG. 5 is for the very last coil with one side inserted in the slot 10 and the other in slot 1.

Figure 6:
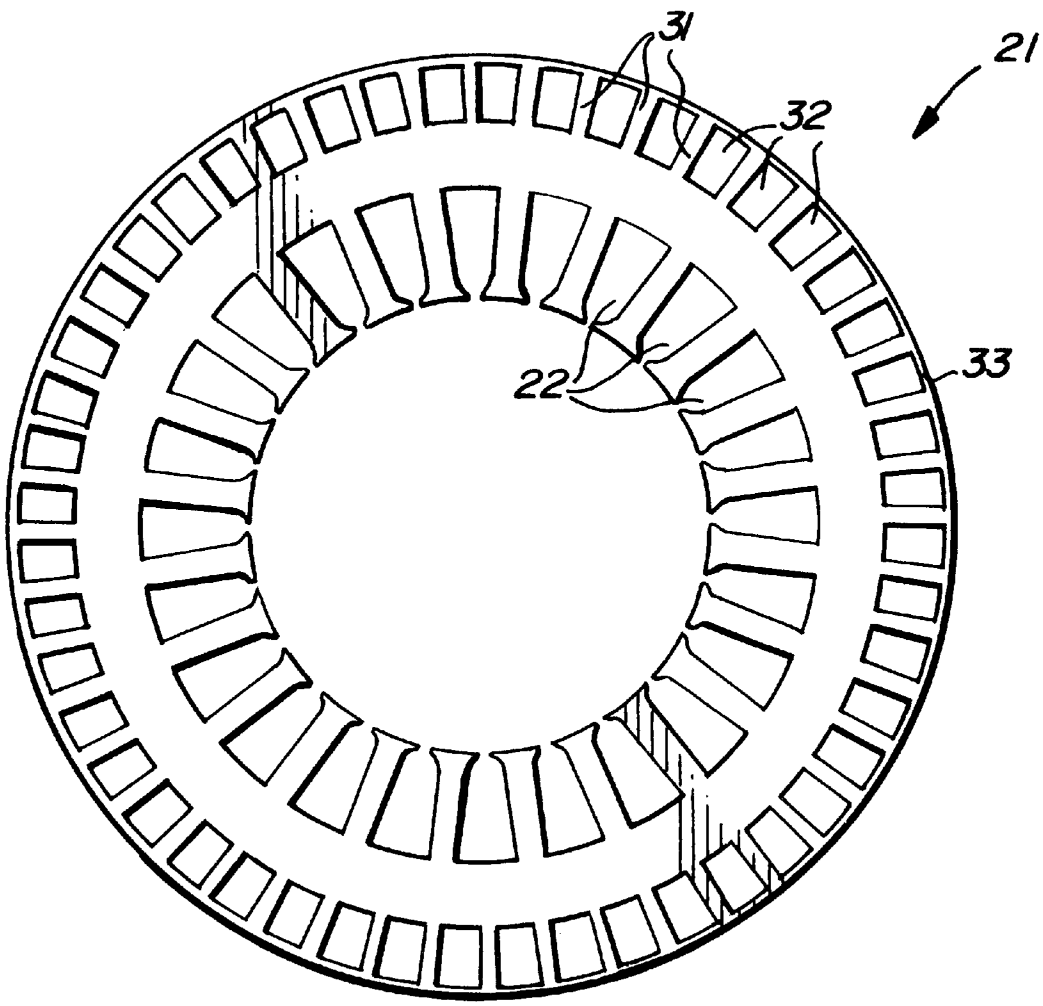
FIG. 6 is a top plan view of an exemplary stator core according to the present invention.

FIG. 6 is a top plan view of an exemplary stator core 21, having slots 22, it is preferred according to the invention. The stator core 21 of FIG. 6 is made of conventional stator material and the housing is part of the stator core 21 according to the invention, having radially extending cooling fins 31 having spaces 32 therebetween, and preferably including a shroud 33 (see FIG. 12A) at the far ends of the cooling fins 31 from the slots 22. The cooling fins 31 are circumferentially spaced by the spaces 32.

Figure 8:
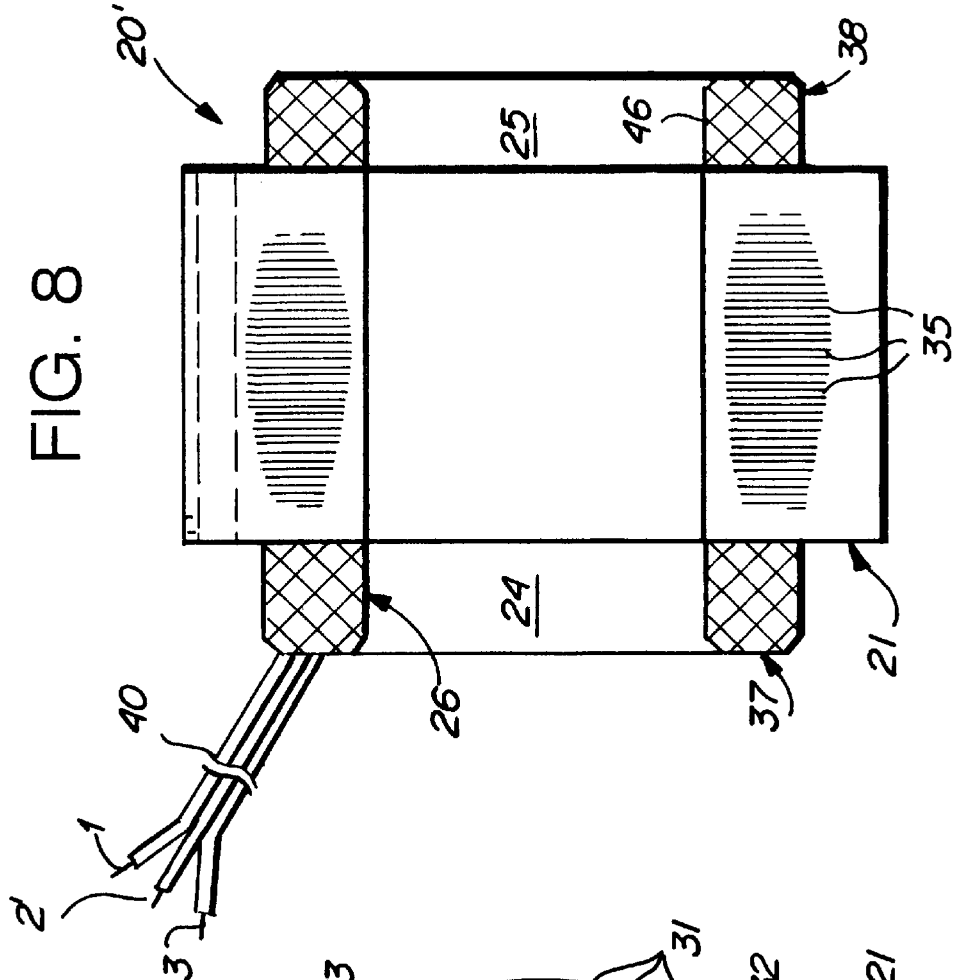
FIG. 8 is a side view, partly in cross section and partly in elevation, of the stator assembly of FIG. 7.
Figure 7:
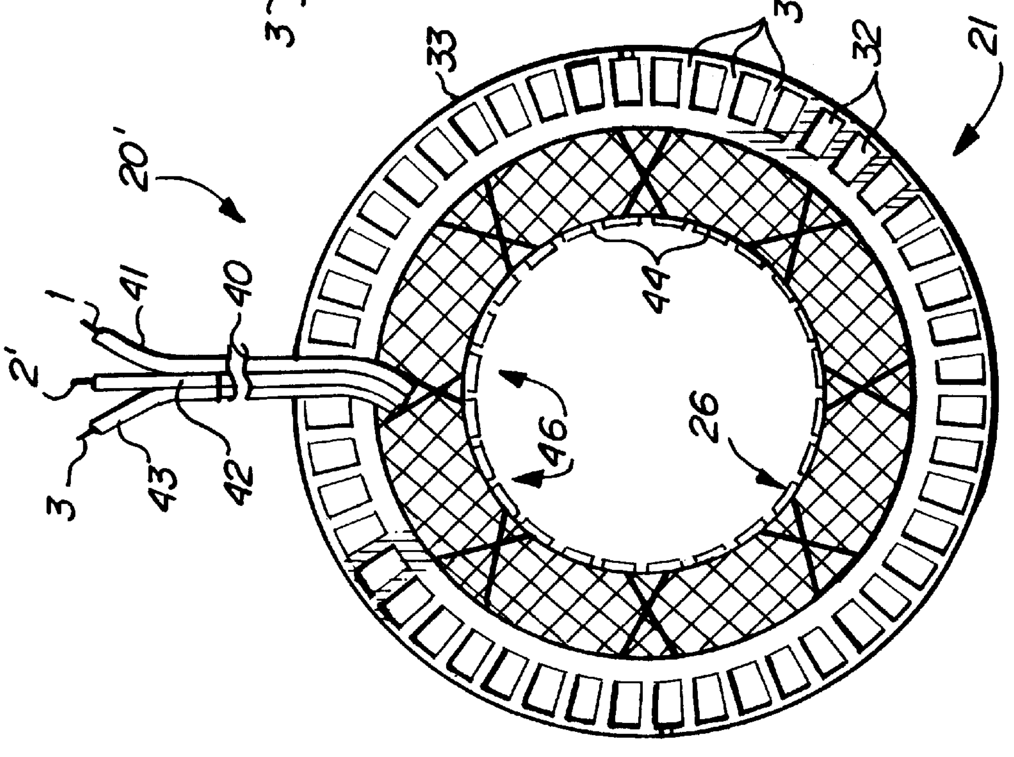
FIG. 7 is a top view of the stator of FIG. 6 with three coils wound thereon utilizing the pattern of FIG. 1.
Figure 9:
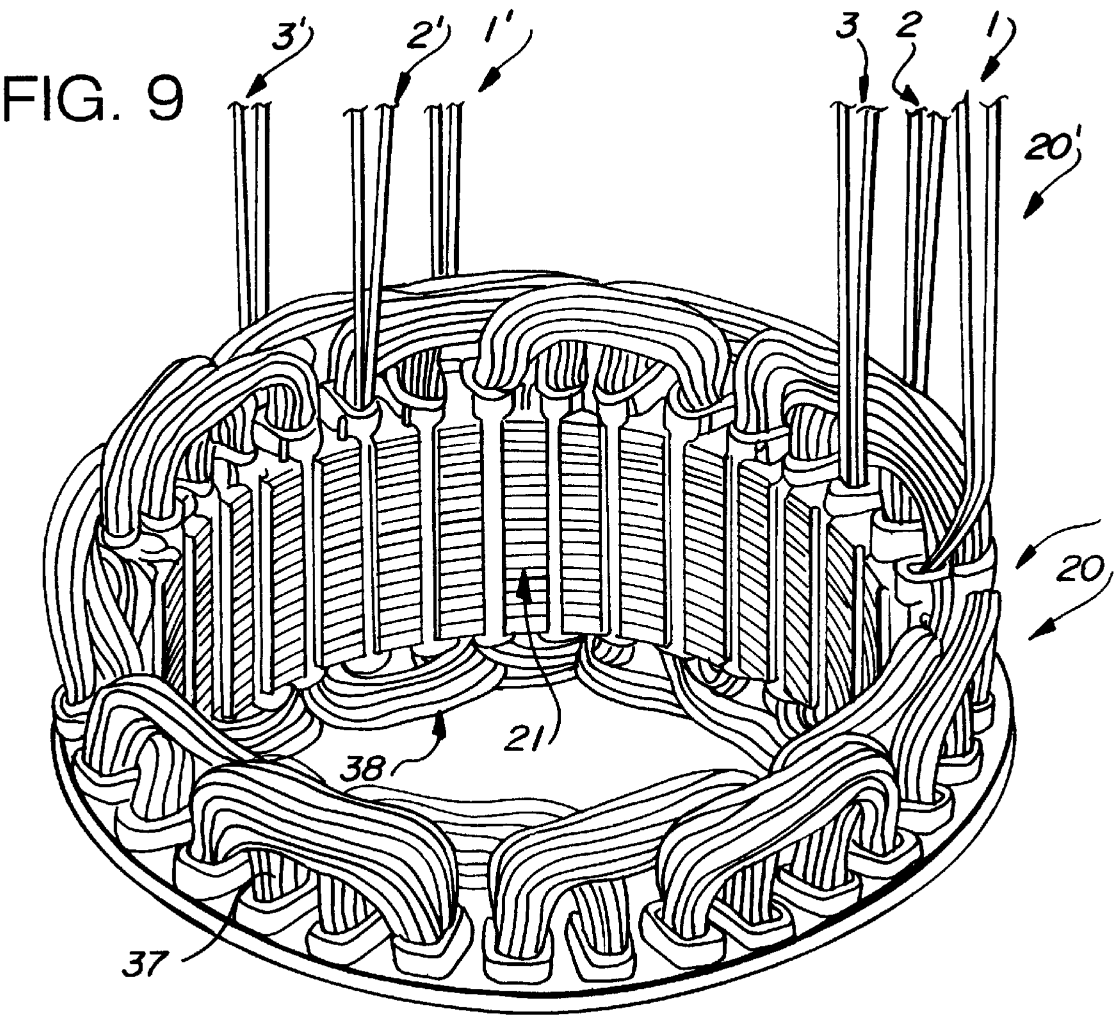
FIG. 9 is a top perspective view of the stator assembly of FIGS. 7 and 8 before the lead lines and coils are laced and with portions of the exterior of the stator cut away for clarity of illustration.

FIGS. 7 through 9 illustrate a stator assembly 20' according to the present invention in much more detail than the schematic illustration of FIG. 1B, and including the stator core 21 of FIG. 6.

As seen in FIG. 8, typically the stator core 21 is formed of a stack of a plurality of thin stator laminates 35, and the winding 26 includes end turns 37, 38 on both sides 24, 25 of the stator core 21. As is conventional the laminates 35 are of ferromagnetic material (e.g. silicon steel), preferably electrically insulated from each other (e.g. by epoxy). The leads 1–3 for the three phases are shown bound together at their root and covered by plastic shrink tubes 41, 42, 43, which typically are of different colors (e.g. 41 is red, 42 is white, and 43 is black, for phases 1 through 3, respectively). Lacing cord 44 is also typically provided for lacing the end turns 37, 38, as seen most clearly in FIG. 7.

Figure 10:
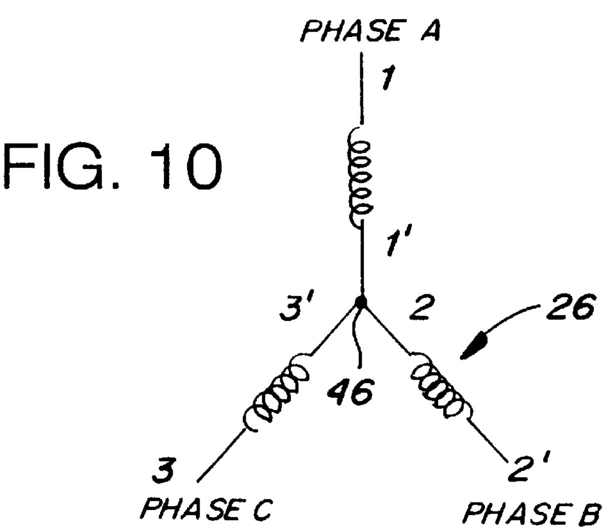
FIG. 10 is a schematic illustration of the interconnections between the phase coils for the stator assembly of FIGS. 7 through 9.

While a number of different configurations may be provided, for the configuration that is illustrated in FIGS. 7 through 9, each phase is wound with four turns per slot, so that the bundles associated with the leads 1, 1'; 2, 2'; and 3, 3'; are the same. A star connection is preferably soldered—as indicated at 46 in FIG. 10—such as by using an appropriate solder and flux, to leads 1', 3' and 2, and the connection therebetween is insulated utilizing conventional tape, and a shrink tube is placed over the wrap connection. The shrink tubes 41–43 are installed and then laced with the lacing cord 40, 44. The entire winding 26 is impregnated using conventional varnish, and Teflon® tubing 46 may be provided in the interior of the stator assembly 20', as illustrated in FIG. 7. FIG. 9 is a perspective illustration of the stator assembly 20' before the leads are connected together and before lacing and placing the Teflon® tubing 46 into proper position.

In the construction of the stator assembly 20' all machined surfaces are kept free of varnish. The direct current resistance and inductance are typically measured between any two leads. The typical dielectric strength is 500 volts, RMS 60 hertz for one minute by twisting all of the motor leads together and "high potting" to the core. The leakage current is typically about 1 milliamp. The insulation resistance is typically 500 volts DC, 15 megaohms per minute from each winding to the core for 10 seconds.

Figure 11:
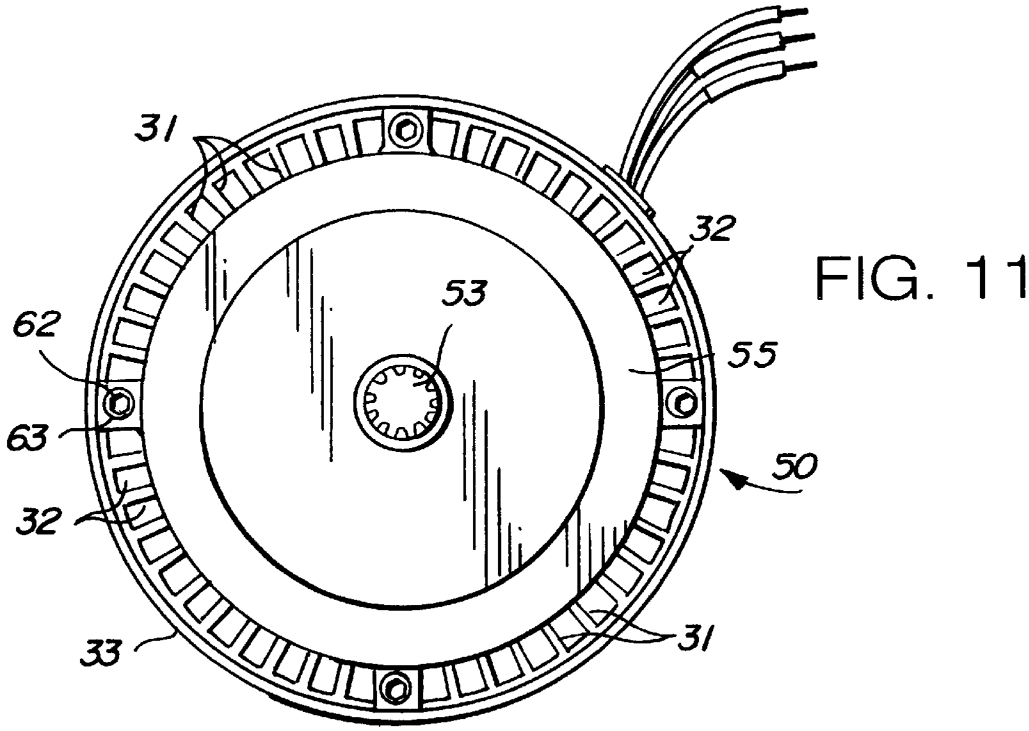
FIG. 11 is a top plan view of an exemplary motor according to the present invention utilizing the stator assembly of FIGS. 7 through 9.
Figure 12A:
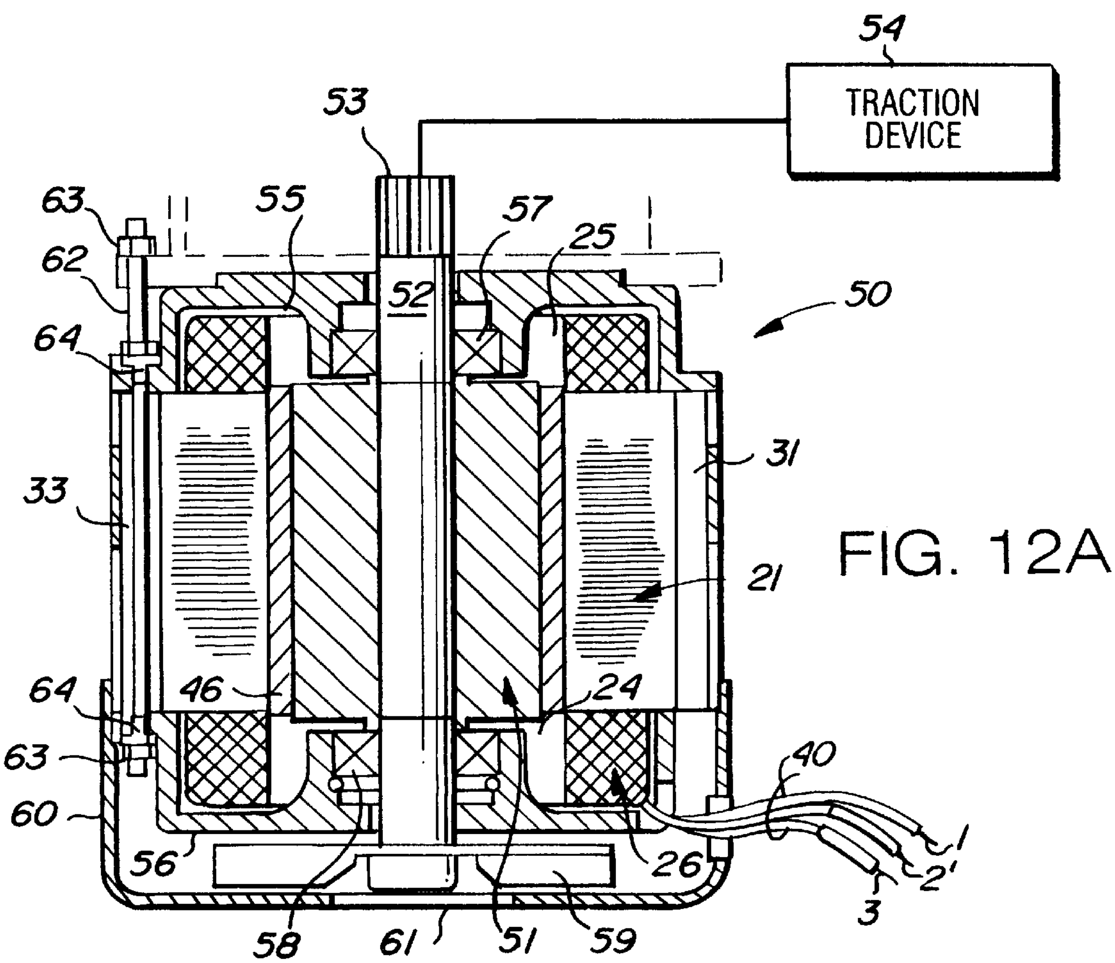
FIG. 12A is a side view, mostly in cross section but partly in elevation, of the motor of FIG. 11.
Figure 12B:
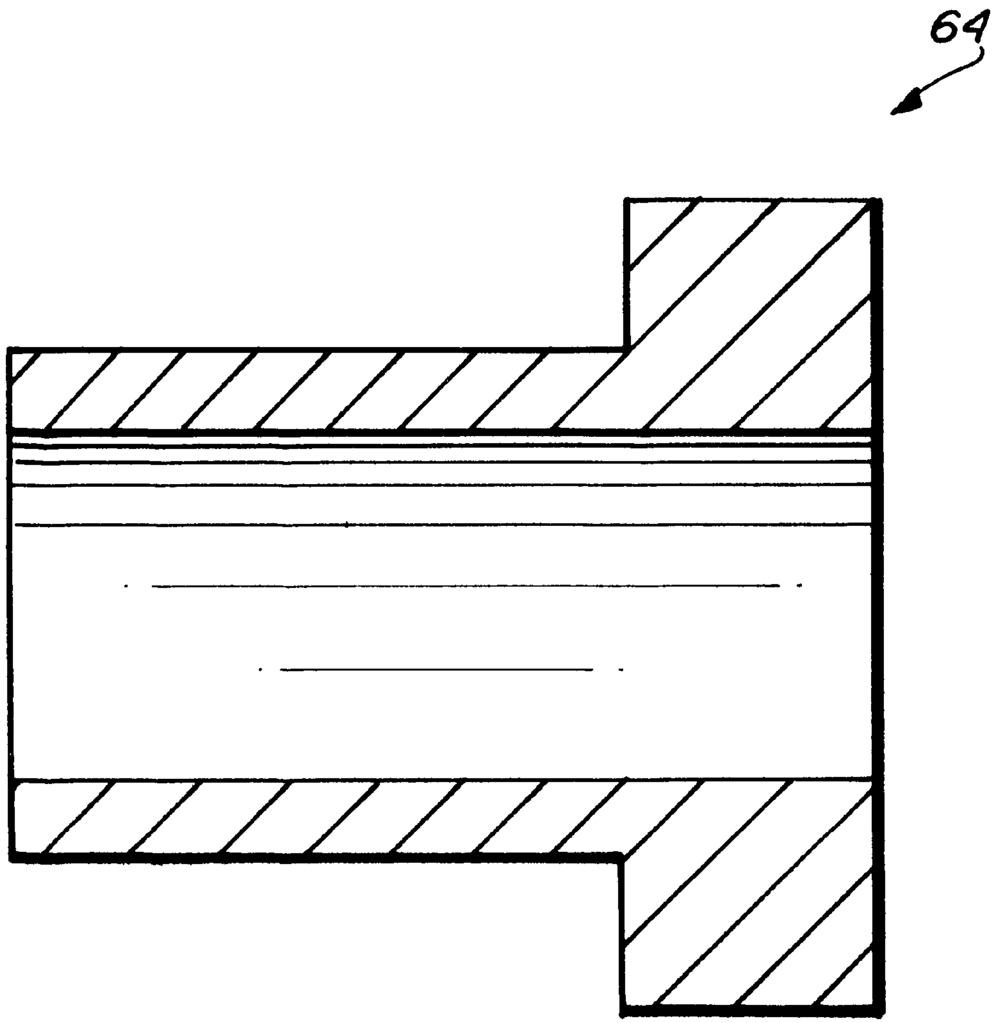
FIG. 12B is a side cross sectional view of a positioning ring of the motor of FIG. 12A.

FIGS. 11, 12A and 12B illustrate an exemplary brushless permanent magnet DC motor, shown generally by reference numeral 50, according to the present invention which includes the stator 21 having first and second sides 24, 25, and a rotor 51 containing permanent magnets (as is conventional) and radially spaced with respect to the stator 21 to cooperate with stator 21. The rotor 51 includes a second shaft 52 having a drive end 53 that is operatively connected in any suitable conventional way to a traction device 54 for driving the traction device, typically utilizing gears, clutches, and the like. The traction device 54 may comprise almost any type of vehicle that is capable of being driven by an electric motor 50, such as a golf cart, electric scooter, electric motorcycle, electric car, slab crab, or boat outboard motor.

As seen in FIG. 12A, and partially in FIG. 11, motor 50 preferably has end caps 55, 56 and the motor 50 also includes bearings 57, 58 mounting the shaft 52 for relatively friction free rotation with respect to the stator housing 21.

If desired a fan 59 may be provided on the end of shaft 52 remote from the drive end 53, for circulating the air past the cooling fins 31, in the spaces 32 between them, to effectively receive heat transferred from the fins 31 and carry the transferred heat away from the motor through the open ends of the spaces 32 surrounding the end cap 55. A fan cover 60, having an air inlet opening 61, may be directly connected to the lower positioning ring 64 (FIGS. 12A and 12B), in heat transfer relationship therewith, to direct the air circulated by the fan 59 through the spaces 32.

The motor 50 also preferably includes means for positively maintaining the bearings 57, 58 concentric with the stator/housing 21 to provide optimized service life. Such means may take a number of conventional forms. In one novel form, as illustrated in FIGS. 11 and 12A, fasteners (e.g. bolts) 62 are provided extending through some of the spaces 32 and holding the end caps 55, 56 together, typically with nuts 63 at the opposite ends of the bolts 62. As seen in FIG. 11, the bolts 62 typically are provided at 90° locations around the circumference of the motor 50, although in some circumstances only three bolts 62 need be provided spaced about 120°, or more bolts, preferably evenly spaced. The bolts 62 preferably are received by precisely dimensioned and machined metal positioning rings 64 at both ends thereof (see FIG. 12A), the bolts 62 extending through the spaces 32 positively locate the radial position of the end caps 55, 56 and thereby keep the bearings 57, 58 concentric with the inside diameter of the stator 21 so that the bearing life is at least the same as for conventional brushless permanent magnet DC motors. An exemplary positioning ring 64 is shown in FIG. 12B.

Figure 14:
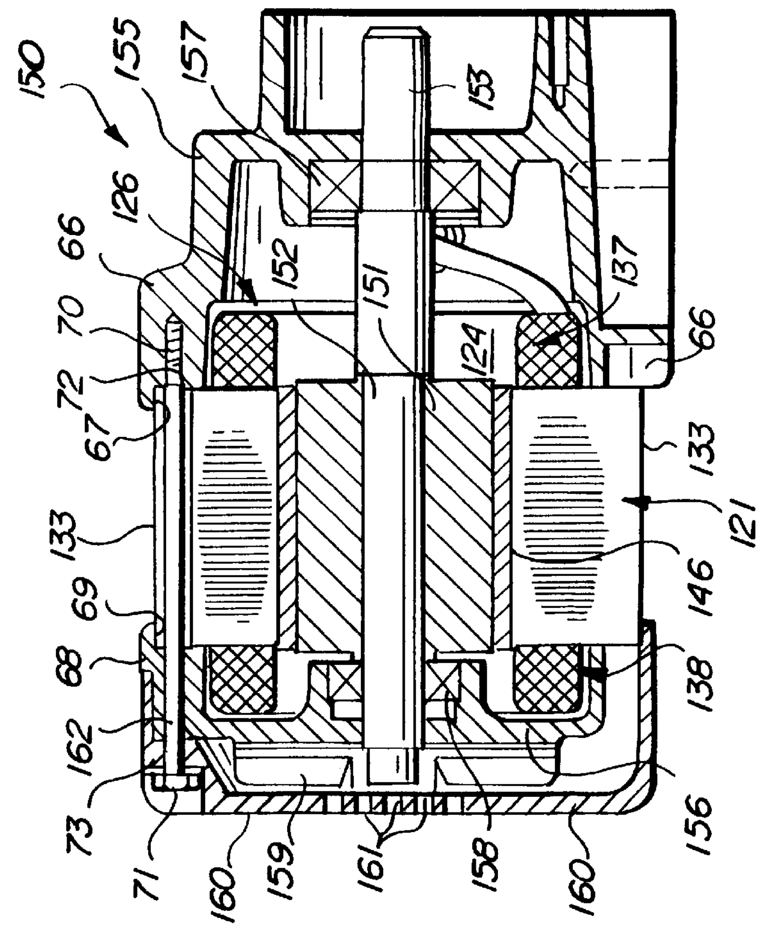
FIG. 14 is a view like that of FIG. 12A for the motor embodiment of FIG. 13.
Figure 13:
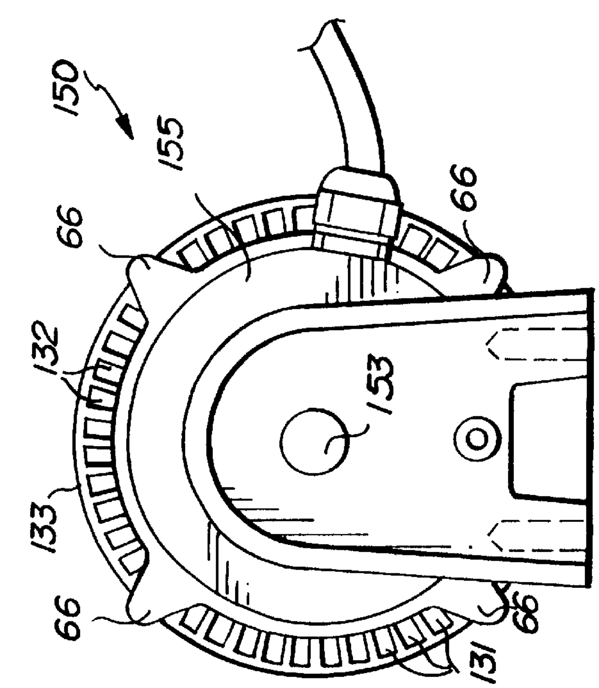
FIG. 13 is an end view of another embodiment of a brushless permanent magnet DC motor according to the present invention utilizing the stator assembly of FIGS. 7 through 9.

Another exemplary motor according to the present invention is illustrated schematically at 150 in FIGS. 13 and 14. In the FIGS. 13 and 14 embodiment components comparable to those in the FIGS. 11 and 12A embodiment are shown by the same reference numeral only preceded by a "1". The major differences between the embodiment of FIGS. 13 and 14 and that of FIGS. 11 and 12A are the configuration of the end caps 155 and 156, and the configuration and components of the positively maintaining means.

The end caps 155, 156 have the configuration illustrated in FIGS. 13 and 14, including radially extending flanges 66 associated with the end cap 155. The flanges 66 have shoulders 67 (see FIG. 14) formed therein which have the same inner arcuate configuration as the exterior arcuate configuration of the shroud 133 of the stator/housing 21.

The end cap 156 also includes radial flanges 68 having shoulders 69 comparable to the shoulders 67, that is having the same basic inner arcuate configuration as the outer arcuate configuration of the shroud 133. Thus, the outside diameter of the stator 121 (that is of the shroud 133 portion thereof) is used to positively locate the end caps 155, 156 so that bearings 157, 158 are positively maintained concentric with the inside diameter of the stator/housing 121 so that the bearing life is at least the same as in conventional brushless permanent magnet DC motors.

In the FIGS. 13 and 14 embodiment, bolts 162, having threaded free ends 70 at one end thereof, and heads 71 at the other end thereof are passed through openings in the flanges 66, 68 and through spaces 132 between the cooling fins 131 to attach the end caps 155, 156 together when the threaded ends 70 are screwed into receiving threaded openings 72 in the flanges 66. In the embodiment illustrated in FIG. 14, the bolts 162 also hold the fan cover 160 in place, in tight heat transfer relationship with the end cap 156, by the bolt head 71 engaging a shoulder 73 formed on the fan cover 160.

It will thus be seen that according to the present invention a stator assembly 20' is provided which has a novel winding configuration 20 in which the windings do not have distinct interconnection wires between coils, and have much smaller end turns 37, 38 than for conventional wave windings since the end turns 37, 38 are distributed on both sides 24, 25 of the stator core 21, resulting in higher power density and higher efficiency. Also, the motor 50, 150 according to the present invention is advantageous since the housing is part of the stator 21, 121 as are the cooling fins 31, 131 and shroud 33, 133. This construction is less costly because there are fewer components and less machining than in conventional constructions, and because there is no thermal gap, or thermal contact, resistance between distinct motor housing and stator components, heat is very efficiently transferred to the cooling fins 31, 131 and carried away by forced air, circulated by the fan 59, 159 through the spaces 32, 132 between the fins 31, 131.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, devices, and methods.

What is claimed is:

1. A method of winding a stator for a brushless permanent magnet DC motor, the stator having first and second ends, a given thickness, and slots, comprising the steps of:

(a) preparing a wire bundle from multiple small size copper wires by laying out a wire having a length L for one branch of a phase coil, and forming a circle from the wire, the circle having a diameter of $L/(N\pi)$, where N is the number of turns per half slot;

(b) placing the wire in the form of the circle in one of the slots of the stator so that some of the wire of the circle is on each side of the stator with a given winding span comparable to less than the thickness of the stator;

(c) using the same pattern, placing all the wire of the bundle, formed into circles, into slots so that the end turns of the windings are on both said first and second sides of the stator; and (d) repeating steps (a)–(c) for the winding coils of one or more other phases, so that there are no distinct interconnection wires between coils, interconnections between the coils comprising part of the coils.

2. A method as recited in claim 1 wherein the slots include at least slots 1–12, and each phase includes first and second leads; wherein steps (a)–(c) are practiced so that the first lead of the first phase is in slot 1, and the second lead of the first phase is in slot 10.

3. A method as recited in claim 2 wherein steps (a)–(c) are practiced so that the first lead of the second phase is in slot 2, and the second lead of the second phase is in slot 11.

4. A method as recited in claim 3 wherein three phases are provided; and wherein steps (a)–(c) are practiced so that the first lead of the third phase is in slot 3, and the second lead of the third phase is in slot 12.

5. A method as recited in claim 1 wherein steps (a)–(d) are practiced using varnish insulated copper wire of a size between about 26–32 AWG.

6. A method as recited in claim 1 wherein steps (a) through (d) are practiced using copper wire of a size between 26–32 AWG.

7. A method as recited in claim 2 wherein steps (a) through (d) are practiced using copper wire of a size between 26–32 AWG.

8. A method as recited in claim 3 wherein steps (a) through (d) are practiced using copper wire of a size between 26–32 AWG.

9. A method as recited in claim 4 wherein steps (a) through (d) are practiced using copper wire of a size between 26–32 AWG.

10. A method as recited in claim 1 wherein the motor also comprises a housing wherein the stator and housing are integral and have radially extending circumferentially spaced cooling fins; and further comprising (e) using a fan powered by the motor, causing air to move past the cooling fins to effectively transfer heat away from the motor.

* * * * *